United States Patent Office 2,848,453
Patented Aug. 19, 1958

2,848,453
POLYETHOXAMER OF A NOVEL QUATERNARY AMMONIUM SALT AND PROCESS FOR PREPARING THE SAME

Walter H. Schuller, Delray Beach, Fla., assignor to American Cyanamid Company, New York, N. Y., a corporation of Maine No Drawing. Application May 22, 1957
Serial No. 660,755

5 Claims. (Cl. 260—249.9)

This invention relates to new and novel methylol derivatives of polyethoxamers of N-(2-hydroxyethyl)-N - (4 - amino - 6 - anilino - s - triazinylmethyl) - N,N-dimethylammonium chloride characterized by the general formula:

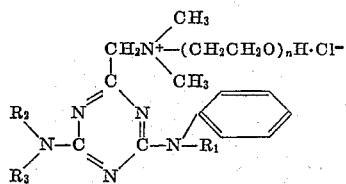

in which $n$ is an integer from 4–50 and $R_1$, $R_2$ and $R_3$ each represents a hydrogen or a methylol radical and at least one of the R's must represent a methylol radical.

The class of compounds characterized as water-soluble colorless liquids find utility as antistatic agents in the treatment of synthetic textile fabrics. Since the compounds are substantially water soluble, they are highly desirable in aqueous treating baths for imparting in a permanent fashion antistatic properties to a synthetic textile fabric, such as for example the polyamides as nylon, the polyesters as Acrilan and the acrylics such as Creslan.

In accordance with the present invention, the class of compounds above defined can be prepared by reacting one equivalent of a polyethoxamer of N-(2-hydroxyethyl) - N - (4 - amino - 6 - anilino - s - triazinylmethyl) - N,N-dimethylammonium chloride with at least one equivalent of formaldehyde, and preferably from 2–6 equivalents, at a temperature in the range of from about 30° C.–100° C. in the presence of sufficient alkali to maintain the solution at a pH of at least 8, and preferably from 10 to 10.5. The equation for the above described reaction may be written according to the following scheme:

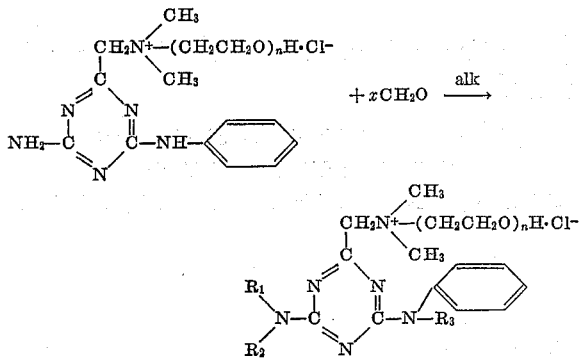

in which $R_1$, $R_2$, $R_3$ and $n$ are the same as defined previously, $x$ is an integer from 1 to 6, inclusive and "alk" means an alkaline medium.

While the reaction will be subsequently described with reference to the specific reactant, the polyethoxamer of N-(2-hydroxyethyl) - N - (4 - amino - 6 - anilino - s - triazinylmethyl)-N,N-dimethylammonium chloride containing about nine ethenoxy groupings, the corresponding bromide or iodide as well as polyethoxamers containing less than or more than nine ethenoxy groups can be also used. The latter are within the purview and contemplation of the present invention.

It has been found surprisingly that the presence of methylol in the polyethoxamer molecule increases the latter's water solubility as well as imparting permanent antistatic properties to a textile fabric. In this manner, twenty or more successive washings do not affect the property of the textile treating agent. It is observed that a textile such as nylon or Acrilan would be substantially permanently free from static electricity.

The temperature for reaction varied over wide limits from approximately 30° C. to 100° C. For example, it has been found that where six equivalents of formaldehyde are reacted with one equivalent of the polyethoxamer derivative, the reaction proceeds in a stepwise manner. At temperatures below about 45° C., approximately one equivalent of the formaldehyde is found to be consumed. Increasing the temperature but not exceeding about 90° C., about 2 to 2.5 equivalents of formaldehyde are found to have been consumed.

In my copending application for Letters Patent, Serial No. 16,532, filed on even date, there is described a method for preparing the polyethoxamers employer herein. Briefly, the polyethoxamers are prepared in the following manner. N-phenyl biguanide and ethyl chloroacetate are reacted at a temperature of from about 50° C.–70° C. to obtain N-phenyl-α-chloroacetoguanamine. The latter is reacted at an average temperature of 85° C. with dimethyl-2-hydroxyethylamine to recover N-(4-amino-6-anilino - s - triazinylmethyl) - N - (2 - hydroxyethyl)-N,N-dimethylammonium chloride, which can then be reacted at temperatures of from 50° C.–125° C. with from 3 to about 50 equivalents of ethylene oxide in the presence of an alcoholic medium containing a base to form the corresponding polyethoxamer defined above.

The invention will be illustrated in conjunction with the following examples which are to be taken as illustrative only and not by way of limitation. All parts are by weight unless otherwise stated.

Example 1

To 90 parts of the polyethoxamer of N-(2-hydroxyethyl) - N - (2 - amino - 4 - anilino - s - triazinylmethyl)-N,N-dimethylammonium chloride containing nine ethenoxy groups is added to 45 parts by volume of aqueous methanol-free formaldehyde solution containing 18 parts of formaldehyde in the presence of sufficient sodium hydroxide to establish a pH of 10. The mixture is heated for twenty minutes at 38° C.– 43° C. In titrating for unreacted formaldehyde, it is found that approximately one equivalent of formaldehyde has been consumed. The structure of the monomethylol derivative of the polyethoxamer may be represented as follows:

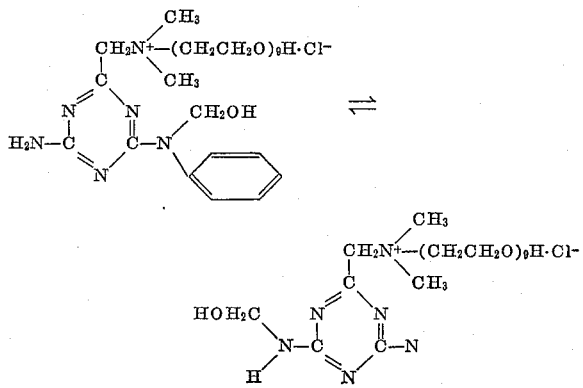

A portion of the solution was freeze dried in vacuo and the methylolated product obtained as a white powdery solid, soluble in water and in aqueous ethanol or dioxane, but is insoluble in nonpolar solvents as for example benzene or kerosene. On heating, the solution, a white infusible mass, was obtained which did not decompose up to 250° C. and was insoluble in water.

*Example 2*

Repeating the procedure of Example 1 in every respect, the reaction mixture obtained in the above example is heated for an additional one and one-half hours (or a total of about two hours) at an average temperature of 75° C. The pH of the solution fell from about 10 to 8, indicating by titration that about 2.4 equivalents of formaldehyde reacted. The resultant product is predominantly the dimethylol derivative of the corresponding polyethoxamer. Upon heating, a white infusible mass was obtained which did not decompose up to about 250° C.

*Example 3*

The reaction solution as obtained in Example 2 is next adjusted to a pH of 10 and then heated for an additional thirty minutes at about 84° C. An analysis of the mixture indicates that 3.0 equivalents of formaldehyde had been consumed. Resultant solution had a pH of 8.5. However, to insure maximum stability of the product upon storage, the pH was readjusted to 10. Resultant solution contains the trimethylol derivative of the corresponding polyethoxamer. When freeze dried in vacuo, the trimethylolated product obtained is a white powdery solid in water. It also has a decomposition temperature of greater than 250° C.

It is a feature of the invention that the methylol derivatives of the polyethoxamers above described impart durable antistatic properties to textiles after several repeated washings. It is an advantage that the compounds herein described are water-soluble. The following example will illustrate these features.

*Example 4*

To 95 parts of water is added 5 parts of the trimethylol derivative of the polyethoxamer as prepared in Example 3 above. A 9″ x 9″ sheet of nylon is next immersed in the solution, passed through squeeze rollers and then oven-dried to remove residual moisture. The dried sheet is folded over twice in the same direction to obtain a sheet measuring 2¼″ x 9″. A charge is induced on the sheet by stroking the same with a glass rod for some fifteen minutes. Now the sheet is exposed to carbon particles that are placed on a table by holding the sheet above the particles. If the sheet can be placed to the latter particles at a close distance without the particles being attracted, the sheet is said to be antistatic. In utilizing the methylol derivative of the polyethoxamer, even at zero distance, no attraction is noted. After twenty or more successive washes, the sheet possesses anti-static properties, indicating the durability and permanency of the methylol derivative.

*Example 5*

Repeating the preceding example in every material detail except that the antistatic agent is omitted, the cloth is shown to be static by stroking it for fifteen minutes. Carbon particles are attracted to it up to a distance of two inches of separation.

I claim:

1. As a new composition of matter: a methylol derivative of N-(2-hydroxyethyl)-N-(4-amino-6-anilino-s-triazinylmethyl)-N,N-dimethylammonium chloride represented by the general formula:

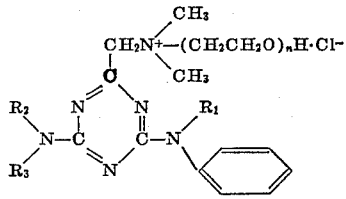

wherein $n$ is an integer from 4 to 50, inclusive, and $R_1$, $R_2$ and $R_3$ each is a radical selected from the group consisting of hydrogen and methylol and at least one of the R's represents a methylol radical.

2. As a new composition of matter: the product of claim 1 in which $n$ is 9, $R_1$ is methylol radicals and $R_2$ and $R_3$ each are hydrogen.

3. As a new composition of matter: the product of claim 1 in which $n$ is 9, $R_1$ and $R_2$ are each methylol radicals and $R_3$ is hydrogen.

4. As a new composition of matter: the product of claim 1 in which $n$ is 9, and $R_1$, $R_2$ and $R_3$ are each methylol.

5. A process for preparing a methylol derivative of a compound characterized by the general formula:

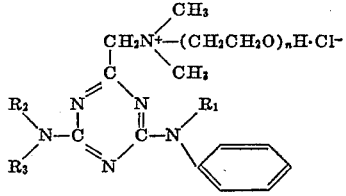

in which $n$ is an integer from 4–50, and $R_1$, $R_2$ and $R_3$ are each a radical selected from the group consisting of hydrogen and methylol and at least one of the R's represents a methylol radical which comprises: reacting one equivalent of N-(2-hydroxyethyl)-N-(4-amino-6-anilino-s-triazinylmethyl)-N,N-dimethylammonium chloride containing of from about 4–50 polyethenoxy groups with at least one equivalent of formaldehyde at a temperature of from about 30° C. to 100° C. in the presence of sufficient alkali to maintain the pH solution at least about 8.

References Cited in the file of this patent

UNITED STATES PATENTS 2,719,156   De Benneville _____ Sept. 27, 1955

UNITED STATES PATENT OFFICE
Certificate of Correction

Patent No. 2,848,453 August 19, 1958

Walter H. Schuller

It is hereby certified that error appears in the printed specification of the above numbered patent requiring correction and that the said Letters Patent should read as corrected below.

Column 2, lines 66 to 72, Example 1, the lower formula should appear as shown below instead of as in the patent:

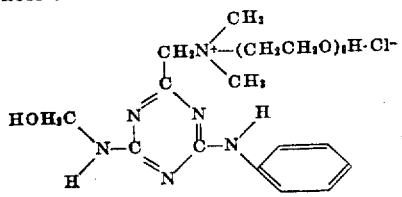

Signed and sealed this 21st day of April 1959.

[SEAL]

Attest:
KARL H. AXLINE,
*Attesting Officer.*

ROBERT C. WATSON,
*Commissioner of Patents.*